(12) United States Patent  
Batra

(10) Patent No.: US 8,165,978 B1  
(45) Date of Patent: Apr. 24, 2012

(54) METHODS AND SYSTEMS TO CONFIGURE, SHARE, AND COMBINE COMPUTER LOGIC KNOWLEDGE MODULES

(75) Inventor: Deepak Batra, Leesburg, VA (US)

(73) Assignee: Arcturus, Inc., Leesburg, VA (US)

( * ) Notice: Subject to any disclaimer, the term of this patent is extended or adjusted under 35 U.S.C. 154(b) by 531 days.

(21) Appl. No.: 12/362,358

(22) Filed: Jan. 29, 2009

Related U.S. Application Data

(60) Provisional application No. 61/024,447, filed on Jan. 29, 2008.

(51) Int. Cl.
*G06N 5/00* (2006.01)
(52) U.S. Cl. .......................................................... 706/45
(58) Field of Classification Search ...................... 706/45
See application file for complete search history.

(56) References Cited

OTHER PUBLICATIONS

Hewlett-Packard Company, Managing Your Network with HP OpenView Network Node Manager, Mar. 2001, pp. 1-658.*

Dotson, A Pivotal Function Approach to Estimation and Prediction for a Model of Software Reliability, CSC '87 Proceedings of the 15th Annual Conference on Computer Science, 1987, pp. 1-5.*

* cited by examiner

*Primary Examiner* — Wilbert L Starks

(57) ABSTRACT

Methods and systems to configure computer program logic knowledge modules (KNOMs) in response to user selections. A KNOM may be configured to cause a processor to measure and/or monitor one or more processes or properties, and to perform one or more functions when a corresponding condition is satisfied, such as to provide a recommendation and/or to implement change. A KNOM may be configured with respect to one or more processes running within a corresponding computer environment, such as a WebLogic environment, and/or an external environment. KNOMs may be shared amongst users within a networked community, and may be combined into KNOM packages, such as to combine expert knowledge from a plurality of users. Peer-based ranking information may be associated with KNOMs and/or users.

22 Claims, 12 Drawing Sheets

700 ⇘

Create Knom

Create Knom:   702
MBean Type: | WebServer ▾ |
Property: | MaxPostSize ▾ | 704
Property Value (%): [      ] 706
Operator: | less than ▾ |
Value: [ 0 ] 708   or | another Mbean | 712
Property Value (%): [      ] 710
714

Note : Percentage value will work only for numeric property values.

| Test | | Add |
  716    718    720

| Test Result | | | |
|---|---|---|---|
| MBean Type | MBean Name | MBean Property | MBean Property Value |
| WebServer | MedRecServer | MaxPostSize | -1 |
| WebServer | ms1 | MaxPostSize | -1 |
| WebServer | Server-0 | MaxPostSize | -1 |

Create Knom

| | | 802 |
|---|---|---|
| Condition: | ((WebServer:MaxPostSize less than 0)) | |

MBean Type: [ServerRuntime ▼]

Property: [Name ▼]  808 — [addAttribute]  804
                                                    810

806 ↙

Recommendation: 
```
The MaxPostSize is set to
connection.getAttribute(WebServer,MaxPostSize). Having
MaxPostSize disabled has allowed denial of service attacks
to occur in the past. We have decided to set this value to
25000 to avoid this in the future.
```

Type the recommendation that will be displayed when this Knom's conditions are met.

[Next]

Create Knom

Create Knom: ╱802

Condition: ((WebServer.MaxPostSize less than 0))

Title: [Check for Max Post Size]╱902

Give your Knom a name to identify what it does

Description: [This checks to see if MaxPostSize is disabled on any server.] ╱904

Provide a short description about what this Knom does  810

Recommendation: [The MaxPostSize is set to connection.getAttribute(WebServer,MaxPostSize). Having MaxPostSize disabled has allowed denial of service]

Type the recommendation that will be displayed when this Knom's conditions are met.

For: ⊙ Advisor  ○ Detector ╱906
Is this Knom for Advisor or Detector? 908

Deploy: [true ▼] ╱910

Do you want to activate this Knom now?

912 ⤵
[Create Knom]

```
public class InitialAndMaxPoolSizeDetectAndFixKnom implements MBean_DetectAndFix {
    public String detect(MBeanHome home, WebLogicMBean webLogicMBean) {
        String recommendation=null;
        JDBCConnectionPoolMBean jdbcConfig = (JDBCConnectionPoolMBean)webLogicMBean;
        if(jdbcConfig.getInitialCapacity()!= jdbcConfig.getMaxCapacity())
        {
            recommendation="In your JDBC configuration initial pool size is not set to max pool size. "+
            " We recommend from performance point of view, setting initial pool size to max pool size. "+
            " This way when your server is under heavy load user doesn't have to wait for new "+
            " connections to be established. It also has an additional benefit, that you don't get any "+
            " surprises with respect to capacity by JDBC Pool growth at run time."+
            " You can get more info on it @ http://e-docs.bea.com/wls/docs90/perform/jdbctuning.html ";
        }
        return recommendation;
    }
}
```

```
public class InitialAndMaxPoolSizeDetectAndFixKnom implements MBean_DetectAndFix {
    public String detect(MBeanHome home, WebLogicMBean webLogicMBean) {
        String recommendation=null;
        JDBCConnectionPoolMBean jdbcConfig = (JDBCConnectionPoolMBean)webLogicMBean;
        if(jdbcConfig.getInitialCapacity()!= jdbcConfig.getMaxCapacity())
        {
            recommendation="In your JDBC configuration initial pool size is not set to max pool size. "+
            " We recommend from performance point of view, setting initial pool size to max pool size. "+
            " This way when your server is under heavy load user doesn't have to wait for new "+
            " connections to be established. It also has an additional benefit, that you don't get any "+
            " surprises with respect to capacity by JDBC Pool growth at run time."+
            " You can get more info on it @ http://e-docs.bea.com/wls/docs90/perform/jdbctuning.html ";
        }
        return recommendation;
    } public boolean fix(RemoteMBeanServer remoteMBeanServer, WebLogicMBean webLogicMBean) {
        boolean fixStatus=false;
        JDBCConnectionPoolMBean jdbcConfig = (JDBCConnectionPoolMBean)webLogicMBean;
        int maxCapacity = jdbcConfig.getMaxCapacity();
        try {
            remoteMBeanServer.setAttribute(webLogicMBean.getObjectName(),
                    new Attribute("InitialCapacity", new Integer(maxCapacity)));
            fixStatus=true;
        } catch (InstanceNotFoundException e) {
            e.printStackTrace();
        } catch (AttributeNotFoundException e) {
            e.printStackTrace();
        } catch (InvalidAttributeValueException e) {
            e.printStackTrace();
        } catch (MBeanException e) {
            e.printStackTrace();
        } catch (ReflectionException e) {
            e.printStackTrace();
        }
        return fixStatus;
    }
}
```

```
*/
public class FileDescriptorDetectKnom implements Detect {
        public String detect(){
                if ((getNoOfFileDescriptors()) < 10000) {
                        return new String("Your system can run out of file descriptors under load conditions.
                                Increase in # of file descriptors is recommended.");
                } else {
                        return null;
                }
        }
        public int getNoOfFileDescriptors()          {
                int noOfFileDescriptors = 4000;
                // OS specific code for getting the # of file descriptors goes here return noOfFileDescriptors;
        }
}
```

```
*
*/
public class FileDescriptorDetectAndFixKnom        implements DetectAndFix {
        public String detect() {
                if ((getNoOfFileDescriptors()) < 10000) {
                        return new String("Your system can run out of file descriptors under load conditions.
                                Increase in # of file descriptors is recommended.");
                } else {
                        return null;
                }
        }
        public boolean fix() {
                return setNoOfFileDecriptors();
        }
        public boolean setNoOfFileDecriptors() {
                boolean success = false;
                // OS specific code for setting the right # of file descriptors goes here
                // return true if appropriate value is set
                // Set success to false if the value is not set for some reason
                success = true;
                return success;
        }
        public int getNoOfFileDescriptors()        {
                int noOfFileDescriptors = 4000;
                // OS specific code for getting the # of file descriptors goes here
                return noOfFileDescriptors;
        }
}
```

FIG. 13

METHODS AND SYSTEMS TO CONFIGURE, SHARE, AND COMBINE COMPUTER LOGIC KNOWLEDGE MODULES

CROSS REFERENCE TO RELATED APPLICATIONS

This patent application claims the benefit of U.S. Provisional Application Ser. No. 61/024,447, titled, "Knoms Framework—Pluggable Knowledge Framework," filed Jan. 29, 2008, which is incorporated herein by reference in its entirety.

BACKGROUND

Computer monitorable processes include processes running within an environment of a corresponding computer system, and processes running in an environment external of the computer system.

Computer programs may be configured to monitor such processes and to perform functions when a corresponding condition is satisfied. Such programs, however, involve significant programming effort, are produced by a single individual or entity, and may not be readily revised by others who may have useful knowledge to contribute.

SUMMARY

Disclosed herein are methods and systems to configure computer program logic modules, referred to herein as knowledge modules (KNOMs), in response to user selections.

KNOM configuration logic may include KNOM template logic pre-configured for a computer monitorable environment, and user input logic to present a user with selectable features related to the computer monitorable environment. The KNOM configuration logic may further include logic to configure a KNOM in response to user selections.

A KNOM may be configured to cause a processor to measure and/or monitor one or more processes or properties, and to perform one or more functions when a corresponding condition is satisfied, such as to provide one or more change recommendations and/or to implement one or more changes.

A KNOM may be configured to cause a processor to measure and/or monitor one or more processes running within an operating environment of the processor, which may include a JAVA environment, and may include a WebLogic environment.

A KNOM may be configured to measure and analyze one or more processes running in an environment outside of the processor operating environment.

KNOMs may be shared amongst users within a networked community of KNOM users.

A plurality of KNOMs may be combined into a KNOM package, such as to combine expert knowledge from a plurality of users.

KNOM ranking information and/or peer ranking information may be associated with KNOMs and corresponding users, respectively, in response to user input.

BRIEF DESCRIPTION OF THE DRAWINGS/FIGURES

FIG. 7 is an exemplary graphical user interface (GUI) to permit a user to configure a KNOM.

FIG. 8 is an exemplary GUI to permit a user to input a recommendation to associate with a KNOM.

FIG. 9 is an exemplary GUI to permit a user to further configure a KNOM.

FIG. 10 illustrates exemplary code corresponding to a Mbean detect KNOM.

FIG. 11 illustrates exemplary code corresponding to a Mbean detect and fix KNOM.

FIG. 12 illustrates exemplary code corresponding to a user-encoded detect KNOM.

FIG. 13 illustrates exemplary code corresponding to a user-encoded detect and fix KNOM.

Figure 1:
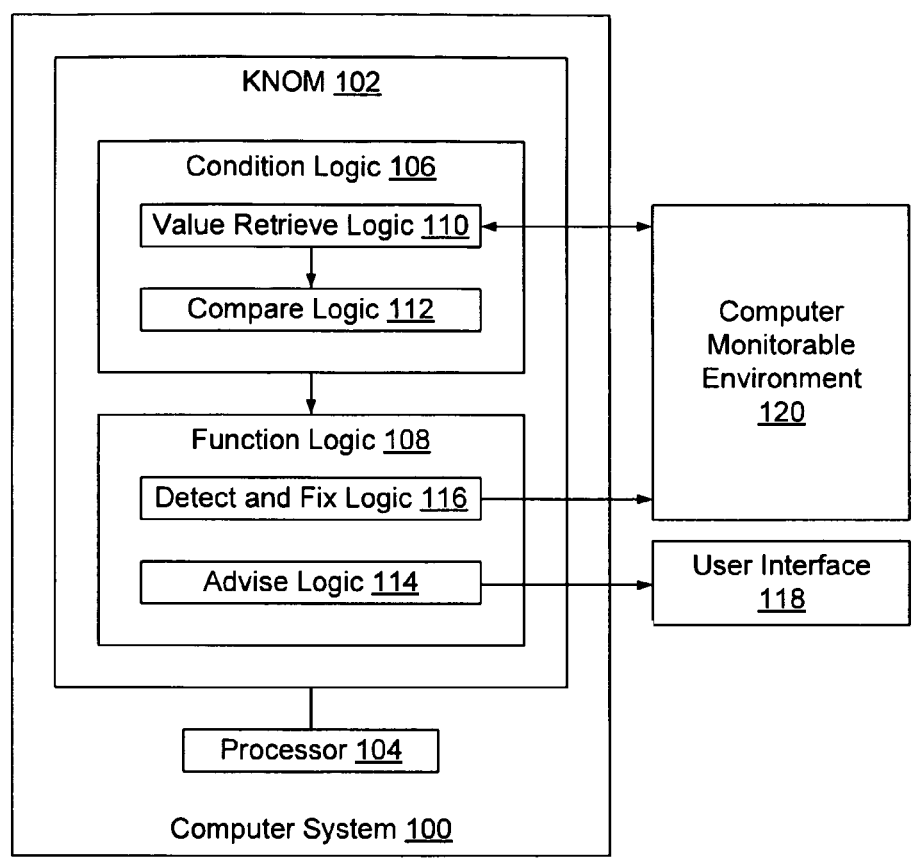
FIG. 1 is a block diagram of an exemplary computer system including an exemplary computer program logic knowledge module (KNOM).

In the drawings, the leftmost digit(s) of a reference number identifies the drawing in which the reference number first appears.

DETAILED DESCRIPTION

FIG. 1 is a block diagram of an exemplary computer system 100, including one or more instruction processors, illustrated here as a processor 104, and an exemplary knowledge module (KNOM) 102. KNOM 102 may be implemented as a computer program product including a computer readable medium having computer program logic stored therein.

KNOM 102 may be configured with respect to one or more computer monitorable environments, illustrated here as an environment 120. Environment 120 may include an environment within computer system 100. Environment 120 may include an environment external of computer system 100, such as, without limitation, a remote control environment and a sensor or detector environment, which may include one or more of a biological sensor or detector environment, a security sensor or detector environment, and a manufacturing and/or service sensor or detector environment.

In the example of FIG. 1, KNOM 102 includes condition logic 106 to cause processor 104 to measure, monitor, and/or evaluate one or more one or more features associated with environment 120, and function logic 108 to cause processor 104 to perform one or more functions when a feature satisfies one or more conditions.

Condition logic 106 may include value retrieve logic 110 to cause processor 104 to retrieve one or more property values associated with one or more computer monitorable processes of environment 120, and compare logic 112 to cause processor 104 to compare the one or more retrieved property values with one or more corresponding thresholds.

Function logic 108 may include advise logic 114 to cause processor 104 to output one or more advice statements or recommendations to a user interface device 118 when a property value satisfies a corresponding threshold.

Function logic 108 may include detect and fix logic 116 to cause processor 104 to implement a change within environment 120 when a property value satisfies a corresponding threshold.

KNOMs may be shared amongst users within a networked community of KNOM users, and a plurality of KNOMs may be combined into a KNOM package, such as to combine expert knowledge from a plurality of users.

Figure 2:
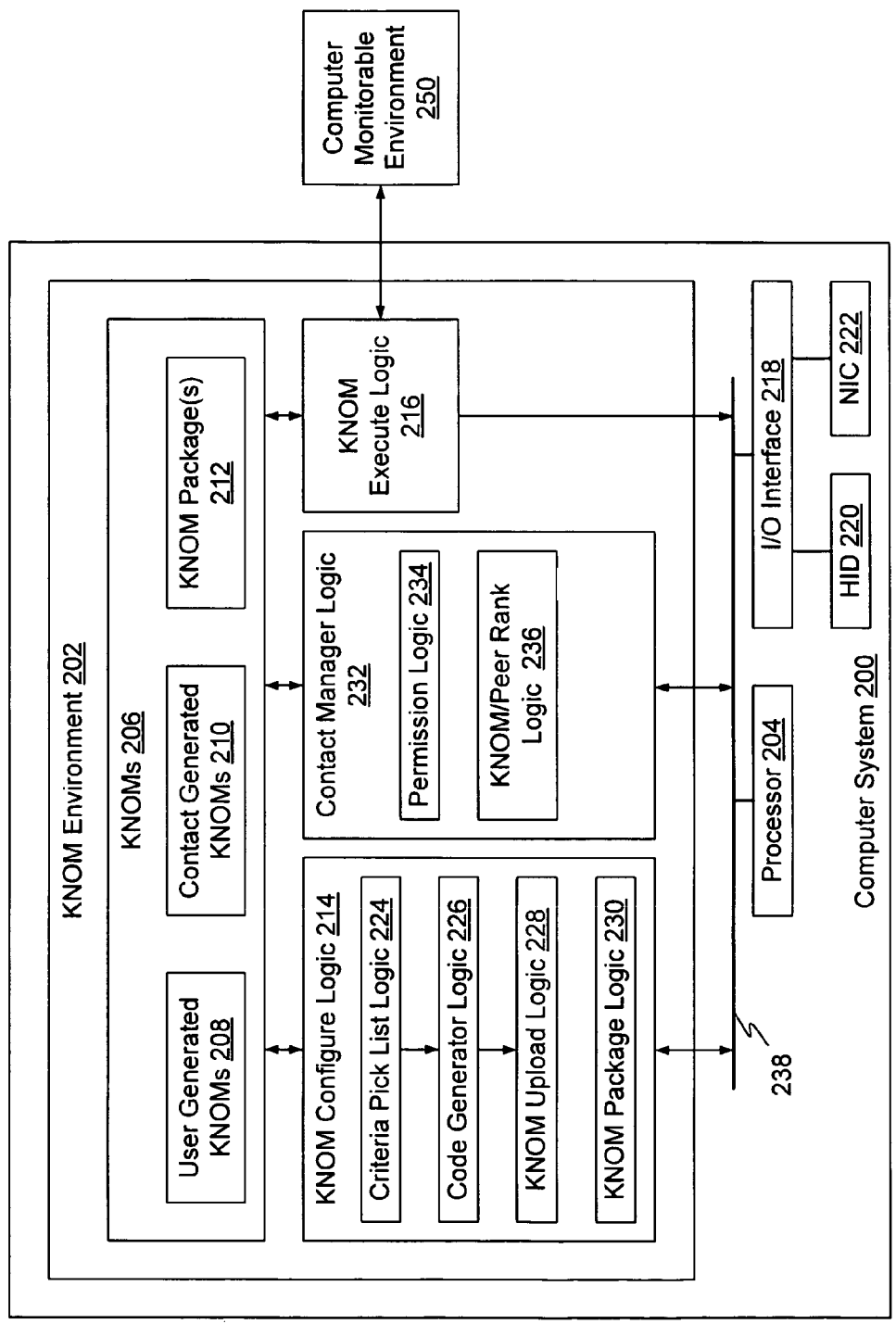
FIG. 2 is a block diagram of a computer system including an exemplary KNOM environment.

FIG. 2 is a block diagram of a computer system 200 including an exemplary KNOM environment 202. KNOM environment 202 may be implemented under control of one or more instruction processors, illustrated here as a processor 204. KNOM environment 202 may be implemented and/or distributed across multiple computer systems or platforms.

KNOM environment 202 includes KNOMs 206, which may include one or more of user generated KNOMs 208, contact generated KNOMs 210, and KNOM packages 212. KNOM packages 212 may include one or more user generated KNOMS 208 and/or contact generated KNOMs 210.

KNOM environment 202 may include one or more of KNOM configure logic 214 to generate and/or configure user generated KNOMs 208, KNOM execute logic 216 to invoke one or more KNOMs 206 with respect to one or more computer monitorable environments 250, and contact manager logic 232 to manage associations with other users or contacts.

KNOM environment 202 may include an input/output (I/O) interface 218 to interface between KNOM environment 202 and a user through one or more human interface devices (HIDs), illustrated in FIG. 2 as HID 220, and/or to interface with contacts through a network interface device or card (NIC) 222.

KNOM configure logic 214 may include criteria pick list logic 224 to permit a user to select KNOM configuration features from one or more lists of selectable features. KNOM generator logic 214 may include logic to permit a user to input code to be included within a user generated KNOM 208.

KNOM configure logic 214 may include code generate logic 226 to generate and/or configure a user generated KNOM 208 in response to user selected configuration features provided by criteria pick list logic 224.

Criteria pick list logic 224 and code generate logic 226 may be pre-configured with respect to one or more computer monitorable environments 250.

Figure 3:
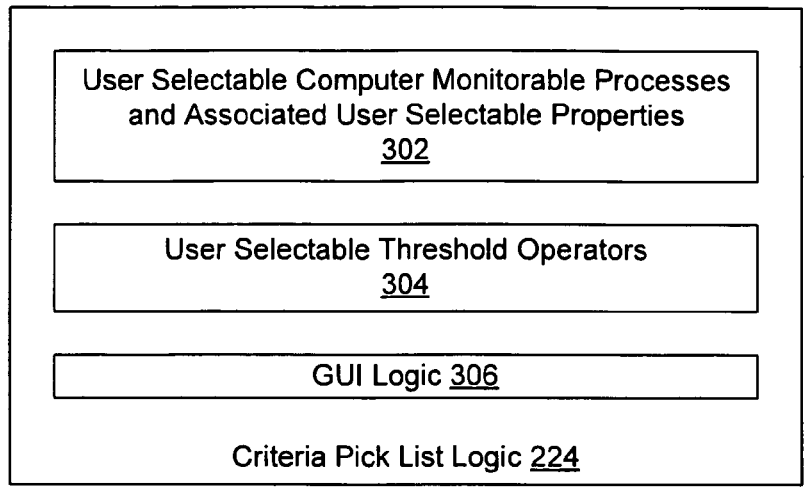
FIG. 3 is an exemplary block diagram of criteria pick list logic.

Criteria pick list logic 224 and code generate logic 226 may include logic to populate and/or configure instances or copies of one or more KNOM templates in response to user selected configuration features. FIG. 3 is an exemplary block diagram of criteria pick list logic 224, and FIG. 4 is an exemplary block diagram of code generate logic 226.

In the example of FIG. 3, criteria pick list logic 224 includes user selectable, computer monitorable processes and associated user selectable properties (user selectable features) 302, and user selectable threshold operators 304. Criteria pick list logic 224 may include graphical user interface (GUI) logic 306 to present user selectable features 302 and user selectable threshold operators 304 to HID 220 (FIG. 2), and to receive user selections in response thereto.

Figure 4:
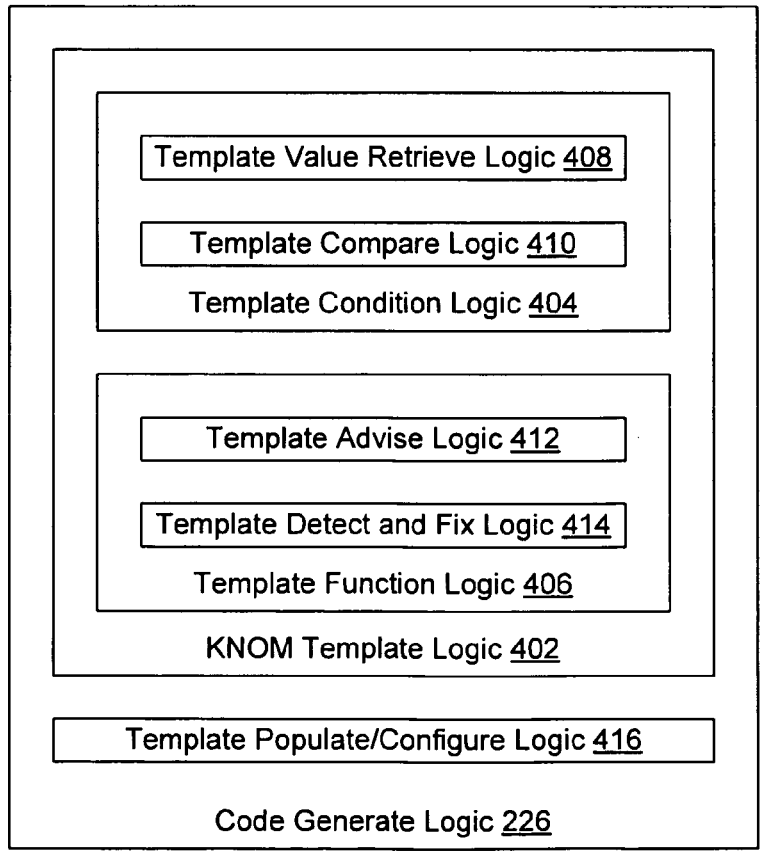
FIG. 4 is an exemplary block diagram of code generate logic.

In the example of FIG. 4, code generate logic 226 includes KNOM template logic 402, which may include template condition logic 404 and template function logic 406. Template condition logic 404 may include one or more of template value retrieve logic 408 and template compare logic 410. Template function logic 406 may include one or more of template advise logic 412 and template detect and fix logic 414.

In the example of FIG. 4, code generate logic 226 further includes template populate/configure logic 416, which may include logic to populate and/or configure an instance of KNOM template logic 402 with user-selected features and user-selected threshold operators provided by criteria pick list logic 224.

KNOM template logic 402 may include a plurality of modules of code associated with a plurality of user selectable features 302 and/or user selectable threshold operators 304, which may be pre-configured for an environment 250. Template populate/configure logic 416 may include logic to select logic from KNOM template logic 402 that corresponds to user-selected features and user-selected threshold operators provided by criteria pick list logic 224.

Referring back to FIG. 2, KNOM generate logic 214 may include KNOM upload logic 228 to associate a KNOM generated by KNOM generator logic 214 with user generated KNOMS 208, and/or to upload one or more user generated KNOMs 208 to one or more contacts and/or to a master KMOM bank.

KNOM generate logic 214 may include KNOM package logic 230 to combine a plurality of user generated KNOMs 208, a plurality of contact generated KNOMs 210, and/or combination of one or more user generated KNOMs 208 and one or more contact generated KNOMs 210, into one or more corresponding KNOM packages 212, in response to user input.

A KNOM 206 may be configured to measure, monitor, and/or evaluate one or more one or more properties associated with one or more computer monitorable processes associated with one or more environments 250.

A user may have one or more areas of expertise and a plurality of user configured KNOMs 208 may be configured in accordance with the one or more areas of expertise. A KNOM package 212 may be configured to include such a plurality user configured KNOMs 208, which may be shared with other users to permit the other users to utilize such expertise.

Similarly, multiple users may each have one or more corresponding areas of expertise, and may each configure one or more KNOMs in accordance with the corresponding areas of expertise. A KNOM package 212 may be configured to include a plurality of KNOMs generated by multiple users, which may be shared with other users to allow the other users to utilize combined expertise of multiple users.

KNOM execute logic 216 may be configured to initiate one or more KNOMs 206 in response to one or more of user input, network administrator input, a schedule, results of another KNOM 206, and combinations thereof.

Contact manager logic 232 may include permission logic 234 to manage user-assigned access rights or permissions associated with user generated KNOMs 208.

Contact manager logic 232 may include one or more of KNOM rank logic and peer rank logic, illustrated in FIG. 2 as KNOM/peer rank logic 236, to associate user-assigned ranking information with contact generated KNOMs 210, and to associate user-assigned peer ranking information with corresponding contacts.

Logic and data associated with KNOM environment 202 may reside in a computer readable medium, which may include one or more of memory and storage associated with computer system 200.

Computer system 200 may include a communication interface 238 to provide communications within computer system 200.

Where environment 250 corresponds to an environment of computer system 200, a KNOM 206 may be configured to interact with environment 250 through communication interface 238.

Where environment 250 corresponds to an environment external of computer system 200, a KNOM 206 may be configured to interact with environment 250 through I/O interface 218, and may be configured to interact through NIC 222.

Figure 5:
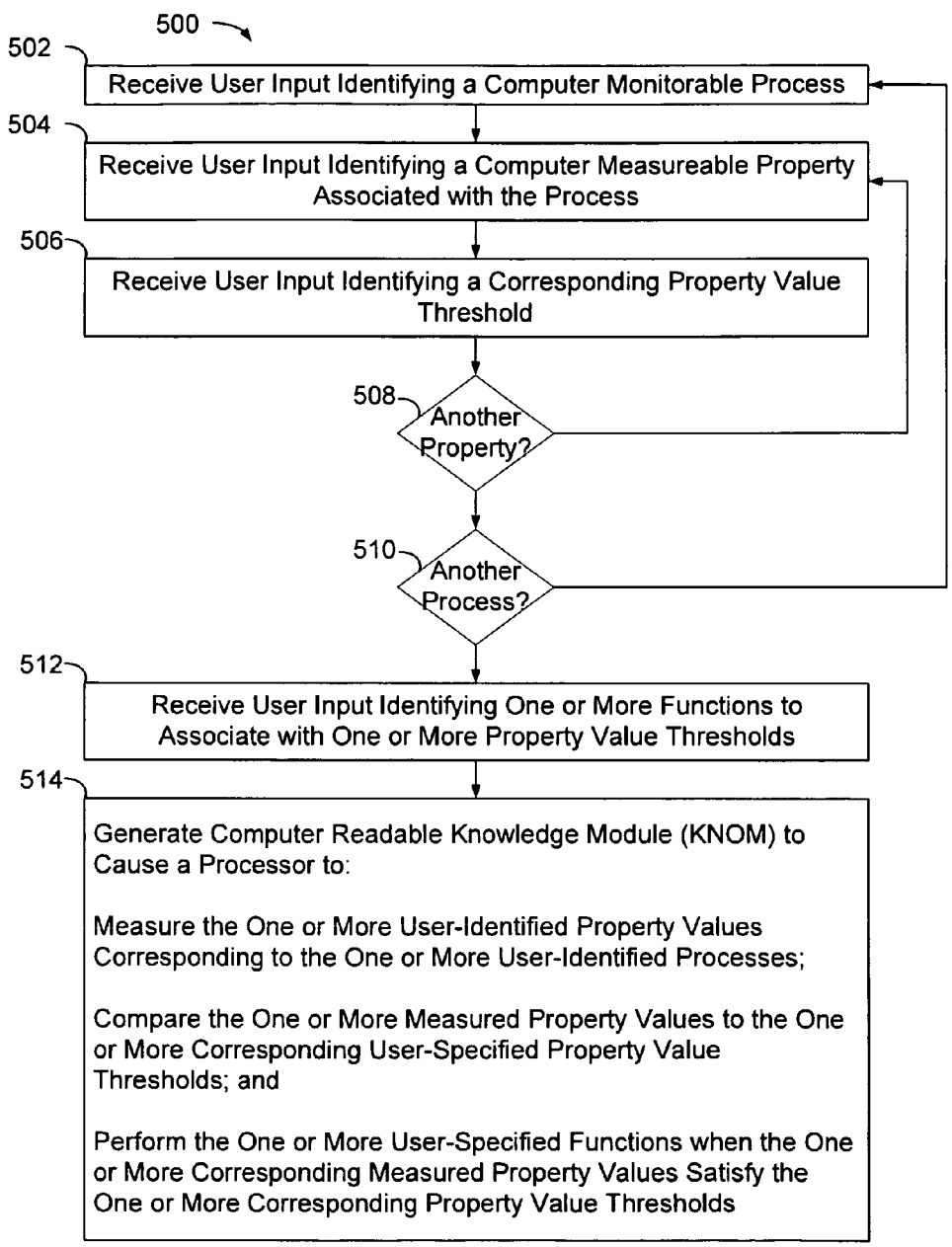
FIG. 5 is a process flowchart of an exemplary computer implemented method of configuring a KNOM in response to user input.

FIG. 5 is a process flowchart of an exemplary computer implemented method 500 of configuring a KNOM in response to user input.

At 502, user input is received, indicative of a computer monitorable process. The user input may be received within a computer system, and may be received within the computer system under control of a KNOM application program.

The receiving of the user input may include and/or be preceded by displaying of a plurality of user-selectable computer monitorable processes, and the user input may include an indication of a user-selected process.

At 504, user input is received indicative of a property associated with the computer monitorable process. The receiving of the user input may include and/or be preceded by displaying of a plurality of user-selectable properties associated with the processes and the user input may include an indication of a user-selected property.

At 506, user input is received indicative of a property value threshold. The receiving of the user input may include and/or be preceded by displaying of user-selectable threshold features, such as operator functions (e.g., greater than, less than, equal to) and a corresponding value entry field. A user may be presented with an option to compare a property value selected at 506 with another property value.

At 508, the user may be provided with an opportunity to select another property of the process at 504, and to provide a corresponding property value threshold at 506.

At 510, the user may be provided with an opportunity to select another computer monitorable process at 502, a corresponding property value at 504, and a corresponding property value threshold at 506.

At 512, user input is received indicative of one or more functions to associate with a set of one or more property value thresholds. The receiving of the user input may include and/or be preceded by displaying of user-selectable functions, such as, a recommendation field to receive user-input text to be output when a corresponding set of one or more property values thresholds are satisfied, and a field or GUI to implement a fix or correction code.

At 514, a KNOM is generated in response to user input in accordance with 502 through 512.

The KNOM may include logic to cause a processor to measure a value of the one or more user-identified properties corresponding to the one or more user-identified computer monitorable processes.

The KNOM may include logic to cause a processor to compare the one or more property values to one or more corresponding user-specified property value thresholds.

The KNOM may include logic to cause a processor to perform the one or more user specified functions when one or more corresponding measured property values satisfy the one or more corresponding property value thresholds.

The KNOM may be generated in an object oriented programming language, which may include a JAVA based programming language.

Figure 6:
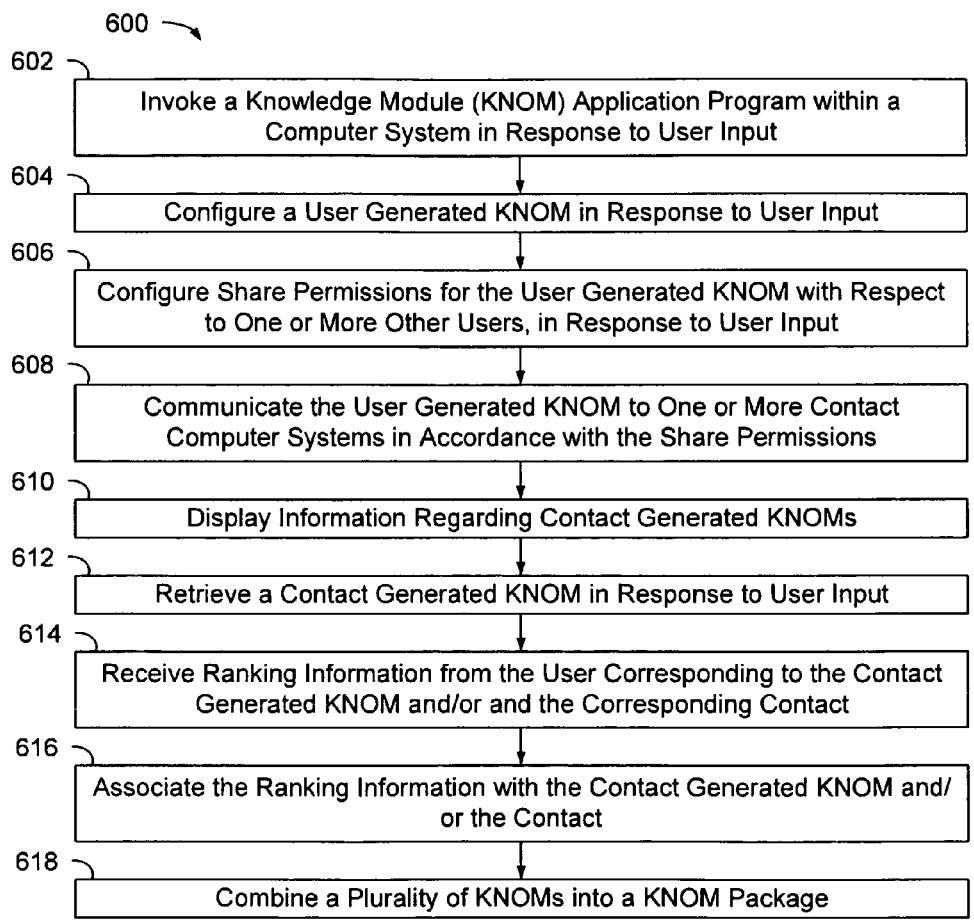
FIG. 6 is a process flowchart of an exemplary computer implemented method of sharing KNOMs and combining KNOMs into KNOM packages.

FIG. 6 is a process flowchart of an exemplary method 200 of sharing KNOMs and combining KNOMs into KNOM packages.

At 602, a KNOM application program is invoked within a computer system in response to input from a user. The KNOM application program may reside on and be invoked within a corresponding user computer system. Alternatively, the KNOM application program may reside on another computer system, and/or may be distributed amongst a plurality of computer systems or platforms.

The invoking of the KNOM application program may include authenticating the user. Authentication may be performed within the user computer system and/or within another computer system within a KNOM network.

The invoking of the KNOM application program at 602 may include establishing communications between a user computer system and one or more other computer systems associated with a KNOM network. Exemplary KNOM networks are disclosed below.

At 604 a user generated KNOM is configured in response to user input, such as described in one or more other examples herein.

At 606, share permissions may configured for the user generated KNOM in response to first user input.

At 608, the user generated KNOM is communicated to one or more other computer systems, in accordance with the share permissions.

The user generated KNOM may be communicated directly to another user computer system, such as a computer system on which a permissioned contact has been authenticated.

The user generated KNOM may be communicated to the contact computer system via one or more intervening computer systems, such as in a peer-to-peer environment.

The user generated KNOM may be communicated to a contact computer system through a master KNOM bank, which may be configured as a centralized communication hub, through which communications, including KNOMs, transit between user computer systems. A master KNOM bank may be configured to authenticate users, to maintain ranking information, to maintain contact information, and/or to maintain KNOM access permissions.

At 610, information regarding KNOMs generated by other users may be displayed by the user computer system. The KNOM application program may be configured to permit the user to search for contact generated KNOMs.

At 612, a contact generated KNOM is retrieved by the user computer system. The contact generated KNOM may be evaluated and/or invoked within the user computer system.

At 614, one or more of peer ranking information and KNOM ranking information may be received in the user computer system, in response to user input.

At 616, the peer ranking information and/or the KNOM ranking information may be associated with the corresponding contact and/or contact generated KNOM. The ranking information may include an indication of the user that provided the ranking information. The ranking information may be maintained within the user computer system, within a master KNOM bank, and/or may be forwarded to other computer systems to be associated with corresponding copies of the contact generated KNOM.

At 618, a plurality of KNOMs may be combined into a KNOM package. The plurality of KNOMs may include one or more of the user generated KNOM and the contact generated KNOM.

A KNOM or a KNOM package may be configured to improve scalability, availability, and/or performance, and/or to detect and amend one or more issues.

A KNOM or a KNOM package may be configured to identify performance bottlenecks in production configuration.

A KNOM or a KNOM package may be configured to identify a cause of a server failure.

A KNOM or a KNOM package may be configured to validate configuration settings.

A KNOM or a KNOM package may be configured to tune a server during off hours.

A KNOM or a KNOM package may be configured to optimize server performance upon server code updates.

A KNOM or a KNOM package may be configured to generate notifications of run-time problems in real-time.

A KNOM or a KNOM package may be configured to generate scheduled reports.

A KNOM or a KNOM package may be invoked from or within an application running on an enterprise server or network system, such as in a WebLogic administrator server. Relatively light-weight or thin agents may be deployed on managed servers, such as to monitor run-time capabilities.

A KNOM or a KNOM package may be invoked from or within applications running in development and production environments.

A KNOM or a KNOM package may be configured to identify runtime and configuration issues.

A KNOM or a KNOM package may be configured to automate repetitive monitoring, compliance and troubleshooting tasks.

A KNOM or a KNOM package may be configured as part of a framework for customized control, monitoring, reporting and fixing of issues.

Detect and fix KNOMs may be configured, for example, to change settings, invoke scripts, send reports, traps, and emails, in real time.

A KNOM may be generated and integrated with other KNOMs and KNOM packages to accommodate conditions as they become potential issues.

Referring back to FIGS. 1 and 2, one or more of environment 120 (FIG. 1) and environment 250 (FIG. 2) may include or represent one or more of an application server environment, a JAVA environment, and a JAVA web server environment, such as a JAVA web server environment available from one or more of WebLogic, Inc., BEA, and Oracle.

Exemplary KNOMs and KNOM environments are disclosed below with reference to an exemplary JAVA web server environment, referred to herein as a WebLogic environment.

In a JAVA environment, a plurality of JAVA objects may be encapsulated in a single object, referred to as a bean. JAVA beans include managed beans, or Mbeans. A Mbean may represent a resource running in a JAVA virtual machine, such as an application and/or a J2EE technical service. A Mbean may be configured to get or pull application configuration parameters or values and/or to collect statistics, such a performance and resource usage. A Mbean may be configured to set or push, such as to notify in the event of a fault or state change.

A JAVA environment KNOM may include one or more JAVA beans, and may include one or more JAVA Mbeans. For example, in WebLogic environment, value retrieve logic 110 (FIG. 1) may include one or more beans, criteria pick list logic 224 (FIG. 2) may include a list of user selectable beans, and/or template value retrieve logic 408 (FIG. 4) may include a plurality of beans.

Where a JAVA environment KNOM is configured with bean logic, the KNOM may be referred to as a bean KNOM. Where a JAVA environment KNOM is configured with free-form JAVA logic, the KNOM may be referred to as a JAVA KNOM or a non-bean KNOM.

An exemplary Mbean KNOM may be configured to determine initial and maximum sizes of JDBC connection pools. The Mbean KNOM may be further configured to perform one or more functions when the initial and maximum sizes are not equal. The one or more functions may include a recommendation to set change one or both of the initial and maximum sizes. The one or more functions may include initiating a change to one or more of the initial and maximum sizes.

An exemplary non-Mbean KNOM may be configured to determine a number of file descriptors. The non-Mbean KNOM may be further configured to provide a recommendation and/or to implement an operating system (OS) level adjustment.

Exemplary pick-list based KNOM configuration examples are provided below with respect to WebLogic environments, and with respect to FIGS. 7 through 11.

FIG. 7 is an exemplary graphical user interface (GUI) 700 to permit a user to configure a KNOM.

GUI 700 includes an Mbean type selection field 702, which may include a pick-list or pull down menu of user selectable Mbeans. In the example of FIG. 7, a WebServer Mbean is selected.

GUI 700 includes a property selection field 704, which may include a pick-list or pull down menu of user selectable properties corresponding to a user selected Mbean. In the example of FIG. 7, a MaxPostSize property is selected.

GUI 700 may include a percentage value field 706, to permit a user to input a percentage value. A corresponding KNOM may be configured to measure a value corresponding to the user selected property in field 704, to apply a user-input percentage value in field 706 to the measured property value, and to compare the percentage of the property value to another value, which may be a static value.

GUI 700 includes an operator selection field 708, which may include a pick-list or pull down menu of user selectable operators, which may include one or more of less than, greater than, and equal to, operators. A corresponding KNOM may be configured to compare a measured property value corresponding to field 704, or a percentage thereof corresponding to field 706, to another value, in accordance with a user-selected operator in field 708.

GUI 700 may include a value field 710 to permit a user to input a value to be compared in accordance with a user-selected operator in field 708. Alternatively, or additionally, GUI 700 may include an Mbean selection feature 712 to permit a user to select another Mbean to be invoked to generate a value to be compared to the measured property value. In other words, a first Mbean at 702 may be compared to a second Mbean at 712. GUI 700 may further include a second percentage value field 714, to permit a user to input a percentage value to be applied to a value generated by the second Mbean.

A combination of a user-selected property value (704, 706), operator (708), and comparison value (710, 712, 714), are referred to as a condition.

GUI 700 may include a user-selectable test feature 716 to permit a user to test a corresponding condition, and may include corresponding test results 720.

GUI 700 may include a user-selectable add feature 718 to permit a user to include the condition within a KNOM. One or more additional conditions may be included within the KNOM.

FIG. 8 is an exemplary GUI 800 to permit a user to input a recommendation to associate with a KNOM.

GUI 800 may include a condition identification 802.

GUI 800 may include a recommendation field 810 to permit a user to input text or a string to be output when a condition identified at 802 is satisfied.

GUI 800 may include a Mbean selection field 804, a property selection field 806, and an add attribute feature 808, to include a value of an Mbean inside a recommendation. Fields 804 and 806 may include pick-lists or pull down menus of user selectable Mbeans and properties, respectively. Mbean selection field 804 and property selection field 806 may be used to identify a dynamic Mbean value. Add attribute feature 808 may be used to paste or include the dynamic Mbean value in a recommendation. A corresponding KNOM may be configured to retrieve the corresponding property value and insert the property value in a corresponding recommendation.

FIG. 9 is an exemplary GUI 900 to permit a user to further configure a KNOM.

GUI 910 includes a title field 902 to permit a user to input a name to associate with the KNOM.

GUI 910 includes a description field 904 to permit a user to input a textual description to associate with the KNOM.

GUI 910 may include a user selectable advisor feature 906 and a user selectable detector feature 908 to configure the KNOM as one of an advise KNOM and a detector KNOM, respectively. An advise KNOM may be associated with configuration knowledge, and a detector KNOM may be associated with runtime behavior knowledge.

GUI 910 includes a create KNOM feature 912 to permit a user to deploy the KNOM, such as to associate the KNOM with user generated KNOMs 208 in FIG. 2.

FIG. 10 illustrates exemplary code 1000 corresponding to a Mbean detect KNOM configured to measure initial and maximum sizes of JDBC connection pools, to compare the sizes to one another, and, when the sizes are not equal, to output a recommendation to increase the initial pool size.

FIG. 11 illustrates exemplary code 1100 corresponding to a Mbean detect and fix KNOM configured to measure initial and maximum sizes of JDBC connection pools, compare the sizes to one another, and, when the sizes are not equal, to output a recommendation to increase the initial pool size, and to invoke logic to increase the initial pool size.

A KNOM may be configured with user-input code. For example, a copy of a template KNOM may be presented to a user and the user may revise the copy, which may include inputting additional code into the template copy. A KNOM may be configured using a combination of pick list logic and user input code.

Exemplary user-input code based KNOM configuration examples are provided below with respect to WebLogic environments, and with respect to FIGS. 12 and 13.

FIG. 12 illustrates exemplary code 1200 corresponding to a user-encoded detect KNOM configured to measure a number of file descriptions, and to provide a recommendation when the number of file descriptors is less than 10,000.

FIG. 13 illustrates exemplary code 1300 corresponding to a user-encoded detect and fix KNOM configured to measure a number of file descriptions, to provide a recommendation when the number of file descriptors is less than 10,000, and to invoke logic to implement changes.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein.

What is claimed is:

1. A computer program product including a computer readable medium having computer program logic stored therein, the computer program logic comprising:

knowledge logic to cause a processor to configure a first knowledge logic module in response to first user input, the knowledge logic module including,
condition logic to cause the processor to compare one or more user specified property values associated with one or more user specified computer monitored processes to one or more user specified thresholds, and
function logic to cause the processor to perform one or more user specified functions when the one or more user specified thresholds of the condition logic are satisfied;
receive logic to cause the processor to receive, over a communication network, a second knowledge logic module configured in response to second user input, the second knowledge logic module including corresponding condition logic and function logic configured in response to the second user input;
associate logic to cause the processor to associate the first and second logic modules as a knowledge logic module package in response to first user input; and
invoke logic to cause the processor to invoke the knowledge logic module package.

2. The computer program product of claim 1, wherein the knowledge logic includes:

pick-list input logic to cause the processor to display a plurality of user selectable computer monitored processes, a corresponding plurality of user selectable properties for each of the user selectable computer monitored processes, and a user configurable threshold corresponding to each of the user selectable properties, the pick-list input logic including logic to cause the processor to receive corresponding user selections; and
logic to cause the processor to configure the knowledge logic module in accordance with the user selections.

3. The computer program product of claim 2, wherein the knowledge logic further includes:

free-form input logic to cause the processor to receive user-input condition logic code and user-input function logic code; and
logic to cause the processor to configure the knowledge logic module in accordance with the user-input condition logic code and the user-input function logic code.

4. The computer program product of claim 3, wherein the knowledge logic includes input selection logic to cause the processor to selectively invoke one of the pick-list input logic and the free-form input logic in response to user input.

5. The computer program product of claim 4, wherein the knowledge logic includes:

JAVA logic to cause the processor to interface with a JAVA-based virtual machine computer environment; and
a plurality of user selectable JAVA management bean logic modules.

6. The computer program product of claim 1, wherein the function logic includes:

advise logic to cause the processor to output user specified text when the one or more user specified thresholds of the condition logic are satisfied; and
detect and fix logic to cause the processor to change one or more variables in a corresponding computer environment when the one or more user specified thresholds of the condition logic are satisfied.

7. The computer program product of claim 1, further including:
peer-to-peer logic to cause the processor to communicate with other users in a peer-to-peer network.

8. The computer program product of claim 1, further including:
master bank logic to cause the processor to receive a plurality of knowledge logic modules from a plurality of user computer systems over the communication network, and to manage access to the plurality of knowledge logic modules in accordance with corresponding access permissions.

9. A method, comprising:
configuring a first knowledge logic module within a computer system in response to first user input, including,
configuring condition logic to cause the computer system to compare one or more user specified property values associated with one or more user specified computer monitored processes to one or more user specified thresholds, and
configuring function logic to cause the computer system to perform one or more user specified functions when the one or more user specified thresholds of the condition logic are satisfied;
receiving, in computer system and over a communication network, a second knowledge logic module configured in response to second user input, the second knowledge logic module including corresponding condition logic and function logic configured in response to the second user input;
associating, in computer system, the first and second logic modules as a knowledge logic module package in response to first user input; and
invoking the knowledge logic module package in computer system.

10. The method of claim 9, wherein the configuring the condition logic includes:
displaying a plurality of user selectable computer monitored processes, a corresponding plurality of user selectable properties for each of the user selectable computer monitored processes, and a user configurable threshold corresponding to each of the user selectable properties;
receiving user selections in response to the displaying; and
configuring the knowledge logic module in accordance with the user selections.

11. The method of claim 10, wherein the configuring the condition logic further includes:
receiving user-input condition logic code and user-input function logic code; and
configuring the knowledge logic module in accordance with the user-input condition logic code and the user-input function logic code.

12. The method of claim 11, wherein the configuring the knowledge logic includes selectively invoking one of the pick-list input logic and the free-form input logic in response to user input.

13. The method of claim 12, wherein the configuring the condition logic includes:
configuring the condition logic with one or more of a plurality of user selectable JAVA management bean logic modules.

14. The method of claim 9, wherein the configuring the function logic includes:
configuring advise logic to cause the computer system to output user specified text when the one or more user specified thresholds of the condition logic are satisfied; and
configuring detect and fix logic to cause the computer system to change one or more variables in a corresponding computer environment when the one or more user specified thresholds of the condition logic are satisfied.

15. The method of claim 9, further including:
communicating with other user computers over a peer-to-peer network.

16. The method of claim 9, further including:
receiving a plurality of knowledge logic modules from a plurality of user computer systems over the communication network, and managing access to the plurality of knowledge logic modules in accordance with corresponding access permissions.

17. A system, comprising:
a plurality of computer systems configured to communicate with one another over a communication network; and
a computer program product including a computer readable medium having computer program logic stored therein, the computer program logic comprising:
knowledge logic to cause a processor within one or more of the plurality of computer systems to configure a first knowledge logic module in response to first user input, the knowledge logic module including,
condition logic to cause the processor to compare one or more user specified property values associated with one or more user specified computer monitored processes to one or more user specified thresholds, and
function logic to cause the processor to perform one or more user specified functions when the one or more user specified thresholds of the condition logic are satisfied;
receive logic to cause the processor to receive, over the communication network, a second knowledge logic module configured in response to second user input, the second knowledge logic module including corresponding condition logic and function logic configured in response to the second user input;
associate logic to cause the processor to associate the first and second logic modules as a knowledge logic module package; and
invoke logic to cause the processor to invoke the knowledge logic module package.

18. The system of claim 17, wherein the knowledge logic includes:
pick-list input logic to cause the processor to display a plurality of user selectable computer monitored processes, a corresponding plurality of user selectable properties for each of the user selectable computer monitored processes, and a user configurable threshold corresponding to each of the user selectable properties, the pick-list input logic including logic to cause the processor to receive corresponding user selections; and
logic to cause the processor to configure the knowledge logic module in accordance with the user selections.

19. The system of claim 18, wherein the knowledge logic further includes:
free-form input logic to cause the processor to receive user-input condition logic code and user-input function logic code; and
logic to cause the processor to configure the knowledge logic module in accordance with the user-input condition logic code and the user-input function logic code.

20. The system of claim 19, wherein the knowledge logic includes input selection logic to cause the processor to selectively invoke one of the pick-list input logic and the free-form input logic in response to user input.

21. The system of claim 20, wherein the knowledge logic includes:
- JAVA logic to cause the processor to interface with a JAVA-based virtual machine computer environment; and
- a plurality of user selectable JAVA management bean logic modules.

22. The system of claim 17, wherein the function logic includes:
- advise logic to cause the processor to output user specified text when the one or more user specified thresholds of the condition logic are satisfied; and
- detect and fix logic to cause the processor to change one or more variables in a corresponding computer environment when the one or more user specified thresholds of the condition logic are satisfied.

* * * * *